United States Patent
Curiel et al.

(10) Patent No.: US 12,516,382 B2
(45) Date of Patent: Jan. 6, 2026

(54) METHOD OF DETERMINING RISK FOR SKIN CANCER DEVELOPMENT AND SKIN CANCER THERAPEUTIC PREVENTION BY MEASURING PD-1/PD-L1 SIGNALING PATHWAY MEMBERS

(71) Applicants: ARIZONA BOARD OF REGENTS ON BEHALF OF THE UNIVERSITY OF ARIZONA, Tucson, AZ (US); George Mason University, Manassas, VA (US)

(72) Inventors: Clara N. Curiel, Tucson, AZ (US); Amanda Fern Baker, Tucson, AZ (US); Sally E. Dickinson, Tucson, AZ (US); Emanuel F. Petricoin, III, Manassas, VA (US)

(73) Assignees: ARIZONA BOARD OF REGENTS ON BEHALF OF THE UNIVERSITY OF ARIZONA, Tucson, AZ (US); GEORGE MASON UNIVERSITY, Manassas, VA (US)

( * ) Notice: Subject to any disclaimer, the term of this patent is extended or adjusted under 35 U.S.C. 154(b) by 1108 days.

(21) Appl. No.: 17/311,538

(22) PCT Filed: Dec. 6, 2019

(86) PCT No.: PCT/US2019/064992
§ 371 (c)(1),
(2) Date: Jun. 7, 2021

(87) PCT Pub. No.: WO2020/118208
PCT Pub. Date: Jun. 11, 2020

(65) Prior Publication Data
US 2022/0017969 A1    Jan. 20, 2022

Related U.S. Application Data

(60) Provisional application No. 62/776,885, filed on Dec. 7, 2018.

(51) Int. Cl.
*C12Q 1/6886* (2018.01)
*C07K 14/705* (2006.01)

(52) U.S. Cl.
CPC .......... *C12Q 1/6886* (2013.01); *C07K 14/705* (2013.01); *C12Q 2600/158* (2013.01)

(58) Field of Classification Search
None
See application file for complete search history.

(56) References Cited

U.S. PATENT DOCUMENTS

| | | | |
|---|---|---|---|
| 9,872,852 B2 | 1/2018 | Chupak et al. | |
| 2016/0222118 A1 | 8/2016 | Chen et al. | |
| 2016/0340407 A1 | 11/2016 | Hodi et al. | |
| 2017/0039345 A1 | 2/2017 | Roder et al. | |
| 2022/0017969 A1 | 1/2022 | Curiel et al. | |
| 2022/0259313 A1 | 8/2022 | Fury et al. | |

FOREIGN PATENT DOCUMENTS

| | | | | |
|---|---|---|---|---|
| WO | WO2014151006 A2 | | 9/2014 | |
| WO | WO 2017/165199 | * | 9/2017 | ............... C12Q 1/68 |

OTHER PUBLICATIONS

Li et al., J Formos Med Assoc, 2007; 106: 975-978 (Year: 2007).*
Han et al., Am J Cancer Res 2020; 10(3): 727-742 (Year: 2020).*
Bachelor et al., Seminars in Cancer Biology 14 (2004) 131-138 (Year: 2004).*
Oeckinghaus and Ghosh, Cold Spring Harb Perspect Biol 2009; 1: a000034 (Year: 2009).*
Schildberg et al., Immunity 44, May 17, 2016 (Year: 2016).*
Knight et al., Cancers 2023, 15, 1106. https://doi.org/10.3390/cancers15041106 (Year: 2023).*
The American Cancer Society website, downloaded Jul. 18, 2024; https://www.cancer.org/cancer/types/melanoma-skin-cancer/causes-risks-prevention/ prevention.html#:~: text= There%20is%20no%20sure%20way, melanoma%20and%20other %20skin%20cancers (Year: 2024).*
Allan Brasier, Cardiovascular Research (2010) 86, 211-218 (Year: 2010).*
Bermudez et al., Cancer Prev Res; 8(8); 720-8 (Year: 2015).*
Greinert et al., "Skin Cancer: New Markers for Better Prevention" Dermatological Center, Klinikum Buxtehude, Elbe Kliniken, Buxtehude, Germany; Year: 2009; 76:64-81.
Patel et al, "PD-L1 Expression as a Predictive Biomarker in Cancer Immunotherapy" Molecular Cancer Therapeutics; 14(4) Apr. 2015.
Teixido et al, "Predictive factors for immunotherapy in melanoma" Annals of Translational Medicine; 2015;3(15):208.
Ikeda et al, "Metastatic basal cell carcinoma with amplification of PD-L1: exceptional response to anti-PD1 therapy" NPJ Genomic Medicine, (2016).

(Continued)

*Primary Examiner* — Christina M Borgeest
(74) *Attorney, Agent, or Firm* — NGUYEN TARBET IP LAW

(57) ABSTRACT

The present invention relates to a method of using family and/or regulatory members of the PD-1/PD-L1 pathway as predictive markers for risk of skin cancer development and as targets for therapeutic prevention of pre-malignant (or pre-cancerous) skin lesions and non-melanoma skin cancer (NMSC). This invention will allow for quantitative measurements of UV-induced expression of PD-1/PD-Li signaling pathway family members (e.g., PD-1, PD-L1, PD-L2) and/or PD-1/PD-L1 regulatory factors including AP-1 and NFκB family members in skin tissue of individuals to determine an individual's 1) risk for skin cancer development and 2) appropriate prophylactic treatment strategy to prevent skin cancer development. This information will facilitate identification of those patients at risk for pre-malignant (or pre-cancerous) skin lesions or subsequent NMSC lesions who would benefit from a PD-1/PD-L1 pathway suppressing therapy to prevent skin cancer development.

3 Claims, 3 Drawing Sheets

(56) References Cited

OTHER PUBLICATIONS

Wang et al, "PD-L1 Expression in Human Cancers and its Association with Clinical Outcomes." Onco Targets and Therapeutics, (2016).
Kim et al, "PD-L1 expression on immune cells, but not on tumor cells, is a favorable prognostic factor for head and heck cancer patients." Scientific Reports, (2016).
Roper et al "PD-L1 expression predicts longer disease free survival inhigh risk head and neck cutaneous squamous cell carcinoma", Pathology (Aug. 2017) 49(5), pp. 499-505.
Heinzerling et al. "Pediciting the response to anti-PD1 therapy in metastatic melanoma" Translational Cancer Research, 2016.
Slater et al, "PD-L1 Expression in Cutaneous Squamous Cell Carcinoma Correlates eighth Risk of Metastasis." Journal of Cutaneous Pathology. 2016.
Garcia-Pedro et al, "Tumor programmed cell death ligand 1expression correlates with nodal metastasis in patients with cutaneoussquamous cell carcinoma of the head and neck" Dermatologic Surgery, Jul. 14, 2017.
Dronca et al. "Bim and soluble PD-L1 (sPD-L1) as predictive biomarkers of response to anti-PD-1 therapy in patients with melanoma and lung carcinoma" Journal of Clinical Oncology. 2017.
International Search Report for PCT Patent Application No. PCT/US24/18709 dated Aug. 8, 2024.
Vaishampayan et al., "PD-L 1 as an emerging target in the treatment and prevention of keratinocytic skin cancer," Jan. 2023, Mol Carcinog 62(1): 52-61. doi: 10.1002/mc.23464.

\* cited by examiner

METHOD OF DETERMINING RISK FOR SKIN CANCER DEVELOPMENT AND SKIN CANCER THERAPEUTIC PREVENTION BY MEASURING PD-1/PD-L1 SIGNALING PATHWAY MEMBERS

CROSS-REFERENCES TO RELATED APPLICATIONS

This application claims benefit of U.S. Patent Application No. 62/776,885, filed Dec. 7, 2018, the specification(s) of which is/are incorporated herein in their entirety by reference.

STATEMENT REGARDING FEDERALLY SPONSORED RESEARCH OR DEVELOPMENT

This invention was made with government support under Grant No. P30 CA023074 awarded by NIH. The government has certain rights in the invention.

BACKGROUND OF THE INVENTION

One out of three new cancers is a skin cancer, making skin cancer the most common malignancy worldwide. Approximately 4.5 million cases of non-melanoma skin cancer (NMSC) occur annually. As incidence rates for NMSC continue to rise, there is an increasing and substantial impact on morbidity and health care costs that account for $8.1 billion/year in skin cancer treatment with the majority of these lesions representing keratinocytic neoplasms.

FIELD OF THE INVENTION

The present invention relates to a method of using family and/or regulatory members of the programmed death receptor-1 (PD-1)/programmed death ligand-1 (PD-L1) pathway as predictive markers for risk of skin cancer development and as targets for therapeutic prevention of pre-malignant (or pre-cancerous) skin lesions and non-melanoma skin cancer (NMSC; e.g., cutaneous squamous cell carcinoma, cSCC, or basal cell carcinoma, BCC). This invention will allow for quantitative measurements of UV-induced expression of PD-1/PD-L1 signaling pathway family members (e.g., PD-1, PD-L1, PD-L2) and/or PD-1/PD-L1 regulatory factors including but not limited to activator protein-1 (AP-1) and NF-κB family members in skin tissue of subjects to determine an subject's 1) risk for skin cancer development and 2) appropriate prophylactic treatment strategy to prevent skin cancer development.

The present invention will facilitate identification of those subjects with skin sun damage, pre-malignant (or pre-cancerous) skin lesions, or NMSC who would benefit from a PD-1/PD-L1 pathway suppressing therapy to prevent skin cancer development. This invention is not limited to determining patients' risk for skin cancer development and may be utilized to determine risk for additional skin condition(s) that may result from dysfunction of the PD-1/PD-L1 signaling pathway including dysregulation of PD-1/PD-L1 signaling and/or PD-1/PD-L1 protein over-expression. In some embodiments, the present invention is a tool to determine individualized risk of skin cancer development and has the potential to determine a personalized therapeutic prevention strategy.

BACKGROUND ART

Cutaneous exposure to solar ultraviolet (UV) radiation is a causative factor in skin photo-carcinogenesis, and inflammatory dysregulation is an accepted key mechanism underlying detrimental effects of acute and chronic UV exposure. Novel prevention approaches and identification of subjects at risk of skin cancer are of prime importance to reduce morbidity and cost associated with this extremely high burden of disease.

The identification of relevant and targetable immune checkpoint inhibitors such as PD-1/PD-L1 is changing the fate of patients diagnosed with several malignancies. In particular, the identification of a high prevalence of PD-L1 expression (25-77%) in cutaneous malignancies including melanoma and cutaneous squamous cell carcinoma (cSCC) has motivated the evaluation of PD-L1 blockade in these patients with promising results. In the case of cSCC there is convincing evidence regarding the effectiveness of treating metastatic cSCC through PD-1/PD-L1 blockade. However, very little is known about the overall trajectory of PD-L1 expression during skin carcinogenesis. In particular, it is unclear of who might be at risk of deleterious immunomodulation following UV exposure and when PD-L1 expression is altered during the skin carcinogenesis process.

Prior studies examining chronically sun-damaged skin have shown increased PD-L1 expression levels in cSCC compared to normal skin and actinic keratosis (AK). In contrast, there is no literature documenting the effect of acute UV exposure on PD-L1 expression in human skin. Acute UV is known to cause transient immunosuppression through depletion of Langerhans cells, inhibitory cytokine production, and recruitment of inhibitory immune cells, and immune modulatory agents are known to revert skin carcinogenesis.

The actual understanding on "how early" these immune-mediated mechanisms play a role in skin carcinogenesis is not well understood. To date, there is no report linking direct UV exposure of the skin and PD-L1 modulation. The novelty of this invention relates to the modulation of this relevant immune escape mechanism which can be observed as early as within hours of exposure to a carcinogen such as UV. Of note, while PD-L1/PD-1 activity in the skin has been primarily described in inflammatory models, the novel and primary focus of the present invention relates to PD-L1 expression in human keratinocytes exposed to acute UV irradiation.

BRIEF SUMMARY OF THE INVENTION

It is an objective of the present invention to provide methods that allow for 1) determining risk of skin cancer development and 2) determining appropriate prophylactic treatment strategy to prevent skin cancer development, as specified in the independent claims. Embodiments of the invention are given in the dependent claims. Embodiments of the present invention can be freely combined with each other if they are not mutually exclusive.

As previously mentioned, very little is known about the overall trajectory of PD-L1 expression during skin carcinogenesis. In particular, it is unclear of who might be at risk of deleterious immunomodulation following UV exposure and when in the skin carcinogenesis process PD-L1 expression is altered. Therefore, there remains a need for an individualized/personalized risk assessment and prophylactic treatment strategy for pre-malignant (pre-cancerous) skin lesions as well as for subsequent NMSC lesions based on identifying specific biomarkers and expression profiles, including those of the PD-1/PD-L1 pathway. This solution addresses the industry need for earlier classification of risk and disease profiles to allow physicians to conduct individualized risk assessment and targeted preventive/prophylactic treatment, thus improving clinical outcomes.

The present invention shows that PD-L1 expression can be induced by acute solar UV exposure (e.g., solar simulated light, or SSL) in a time and dose-dependent manner both in cultured keratinocytes and in normal human skin. The present invention presents a novel method to assess the differential expression of PD-1/PD-L1 signaling pathway family members, induced by acute UV exposure to healthy skin, as an independent predictor for risk of skin cancer development, specifically for cSCC, and potentially for other skin cancers.

The present invention features a new method of use of PD-1/PD-L1 as a tool to determine risk of skin cancer development and has the potential as a screening tool to determine therapeutic prevention strategies for each individual patient. Physicians will be able to use this assessment to determine risk of skin cancer and recommend personalized therapeutic prevention strategies, effectively assisting physicians in making the best decisions early for their patients and avoiding the toxic effects of therapies.

One of the unique and inventive technical features of the present invention is using radiation-induced PD-1/PD-L1 expression to determine risk of skin cancer development and therapeutic prevention strategies for subjects. In particular, this invention utilizes a known carcinogen and environmental stressor (e.g., UV light) to elicit the expression of PD-1/PD-L1 in cells at risk of malignant transformation related to the exposure to UV light. None of the presently known prior references or work has the unique inventive technical feature of the present invention (e.g., use of SSL-induced PD-1/PD-L1 expression as a biomarker for risk of skin cancer development).

Furthermore, the prior art teach away from the present invention because radiation has been primarily implicated in the carcinogenesis process through alteration in tumor suppressors and/or oncogenes with increasing mutations through the malignant transformation process. Therefore, it would be not obvious and counter-intuitive to use a known causative factor of carcinogenesis, e.g., UV, to induce a biomarker change that would be indicative of risk of premalignancy, pre-malignancy, or carcinogenesis, making it difficult to differentiate if an early carcinogenic change was initially present or was induced by the diagnostic method. However, the present invention utilizes radiation-induced expression of a molecule (e.g., biomarker, PD-L1) to stratify the risk of skin cancer development. Surprisingly, acute UV light causes induction of PD-L1 expression in skin in a time-dependent manner in regions suspected of developing or having skin cancer versus regions not suspected of developing or having skin cancer. Dramatic upregulation of PD-L1 protein expression observed both in humans and in human cell culture indicates that the response is robust and reproducible. Although UV immunomodulation has been documented in the skin, it was surprising to observe a variable, but highly prevalent modulation of PD-L1 in human skin when exposed to UV light. In addition, the present invention brings the relevance of PD-1/PD-L1 signaling from the adjuvant and treatment arena into the early carcinogenesis/risk stratification process. It is not obvious that a cancer treatment target can be used for: 1) therapeutic prevention; 2) be directly associated with exposure to a carcinogen, in this case UV; and 3) to be implemented as a risk factor of disease.

The present invention features an in vitro method for determining a risk of developing skin cancer based on differential expression of PD-1/PD-L1 between a non-irradiated sample and an irradiated sample (e.g., skin tissue or skin cells). In preferred embodiments, the method comprises measuring expression of family, regulatory, and/or downstream signaling member(s) of PD-1/PD-L1 pathway in a skin sample obtained from a region of interest that has not been irradiated and in a skin sample obtained from the same region of interest (or area in close proximity to origin of non-irradiated sample) that has been subsequently irradiated. A skin sample is obtained from the region of interest before and after UV radiation. The method then determines a risk of developing cancer in the skin sample based on a difference in the measured expression of family, regulatory, and/or downstream signaling member(s) of PD-1/PD-L1 pathway between non-irradiated sample and irradiated sample. A non-limiting example of a difference in expression (or differential expression) that determines risk of developing skin cancer in the sample comprises at least 5%.

The present invention also features an in vitro system for determining a risk of developing skin cancer based on differential expression of PD-1/PD-L1 between a non-irradiated sample and an irradiated sample (e.g., skin tissue or skin cells). The system comprises a means for measuring expression of family, regulatory, and/or downstream signaling member(s) of PD-1/PD-L1 pathway in a skin sample obtained from a region of interest that has not been irradiated and a skin sample obtained from the same region of interest (or area in close proximity to origin of non-irradiated sample) that has been subsequently irradiated. The system also comprises a means for determines a risk of developing cancer in the skin sample based on a difference in the measured expression of family, regulatory, and/or downstream signaling member(s) of PD-1/PD-L1 pathway between non-irradiated sample and irradiated sample. A non-limiting example of a difference in expression (or differential expression) that determines risk of developing skin cancer in the sample comprises at least 5%.

The present invention further features an in vitro method for determining a risk of developing skin cancer in a subject suspected of developing skin cancer. In preferred embodiments, the method comprises measuring expression of family, regulatory, and/or downstream signaling member(s) of the PD-1/PD-L1 pathway in a first tissue sample obtained from a region of interest, including an area suspected of developing skin cancer, prior to applying UV radiation to the region of interest of the subject. This first tissue sample is not irradiated and is considered a non-irradiated tissue sample and is isolated or obtained from the region of interest prior to applying UV radiation. Multiple tissues samples (e.g., 2, 3, or at least 4) can be obtained prior to radiation. After applying UV radiation to the region of interest of said subject, a tissue sample is then isolated from the irradiated region of interest, typically between 1 and 72 hours post-irradiation (multiple tissues samples (e.g., 2, 3, or at least 4) can be obtained after radiation). Expression of family, regulatory, and/or downstream signaling member(s) of PD-1/PD-L1 pathway is also measured in irradiated tissue sample(s) (can be considered as second tissue sample obtained from said region of interest, this second tissue sample is irradiated). The method then determines a risk of developing skin cancer in the subject based on the difference in measured expression of family, regulatory, and/or downstream signaling member(s) of PD-1/PD-L1 pathway between said first tissue sample (non-irradiated tissue sample) and said second tissue sample (irradiated tissue sample). A non-limiting of a difference in expression that determines a risk of developing skin cancer in said subject comprises at least 5%.

The present invention also features an in vitro system for determining a risk of developing skin cancer in a subject suspected of developing skin cancer based on differential expression of PD-1/PD-L1 between a non-irradiated sample and an irradiated sample (e.g., skin tissue or skin cells) from a region of interest or area of suspected risk of skin cancer of a subject. The system comprises a means for measuring expression of family, regulatory, and/or downstream signaling member(s) of PD-1/PD-L1 pathway in a skin sample obtained from a region of interest that has not been irradiated and a skin sample obtained from the same region of interest (or area in close proximity to origin of non-irradiated sample) that has been subsequently irradiated. The system also comprises a means for determines a risk of developing cancer in the skin sample based on a difference in the measured expression of family, regulatory, and/or downstream signaling member(s) of PD-1/PD-L1 pathway between non-irradiated sample and irradiated sample. A non-limiting example of a difference in expression (or differential expression) that determines risk of developing skin cancer in the sample comprises at least 5%.

The present invention further features a method for preventing development of skin cancer in a subject at risk for developing skin cancer. The method comprises first measuring expression of family, regulatory, and/or downstream signaling member(s) of the PD-1/PD-L1 pathway in a first tissue sample obtained from a region of interest, including an area suspected of developing skin cancer, prior to applying UV radiation to the region of interest of the subject. This first tissue sample is not irradiated and is considered a non-irradiated tissue sample and is isolated or obtained from the region of interest prior to applying UV radiation. After applying UV radiation to the region of interest of said subject, a sample is then isolated from the irradiated region of interest, typically between 1 and 72 hours post-irradiation and expression of family, regulatory, and/or downstream signaling member(s) of PD-1/PD-L1 pathway is measured in an irradiated tissue sample (can be considered as second tissue sample obtained from said region of interest, wherein this second tissue sample is irradiated). The method then determines a risk of developing skin cancer in the subject based on the difference in measured expression of family, regulatory, and/or downstream signaling member(s) of PD-1/PD-L1 pathway between said first tissue sample (non-irradiated tissue sample) and said second tissue sample (irradiated tissue sample). A non-limiting of a difference in expression that determines a risk of developing skin cancer in said subject comprises at least 5%. A management strategy to prevent development of skin cancer in said subject is then developed based on determined risk of developing skin cancer. Non-limiting examples of a management strategy comprise administering drug(s) that alter PD-1/PD-L1 signaling or expression, drugs that are used to treat skin cancer, and/or drugs for therapeutic prevention, recommending lifestyle changes, additional and/or more frequent monitoring or assessment, and/or implementing alternative interventions or prophylactic treatments thereof to said subject.

The present invention also features an in vitro system for preventing development of skin cancer in a subject at risk for developing skin cancer based on differential expression of PD-1/PD-L1 between a non-irradiated sample and an irradiated sample (e.g., skin tissue or skin cells) from a region of interest or area of suspected risk of skin cancer of a subject. The system comprises a means for measuring expression of family, regulatory, and/or downstream signaling member(s) of PD-1/PD-L1 pathway in a skin sample obtained from a region of interest that has not been irradiated and a skin sample obtained from the same region of interest (or area in close proximity to origin of non-irradiated sample) that has been subsequently irradiated. The system also comprises a means for determines a risk of developing cancer in the skin sample based on a difference in the measured expression of family, regulatory, and/or downstream signaling member(s) of PD-1/PD-L1 pathway between non-irradiated sample and irradiated sample. A non-limiting example of a difference in expression (or differential expression) that determines risk of developing skin cancer in the sample comprises at least 5%. The system also comprises a means to develop a management strategy to prevent development of skin cancer in said subject based on determined risk of developing skin cancer. Non-limiting examples of a management strategy comprise administering drug(s) that alter PD-1/PD-L1 signaling or expression, drugs that are used to treat skin cancer, and/or drugs for therapeutic prevention, recommending lifestyle changes, additional and/or more frequent monitoring or assessment, and/or implementing alternative interventions or prophylactic treatments thereof to said subject.

In preferred embodiments, the present invention is used as a screening diagnostic for risk of skin cancer development.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 2A show representative PD-L1 IHC images from 1 subject, 20×.

FIG. 2B shows quantification of PD-L1 epidermal expression from 20 subjects acutely exposed to solar simulated light (SSL).

Figure 3A:
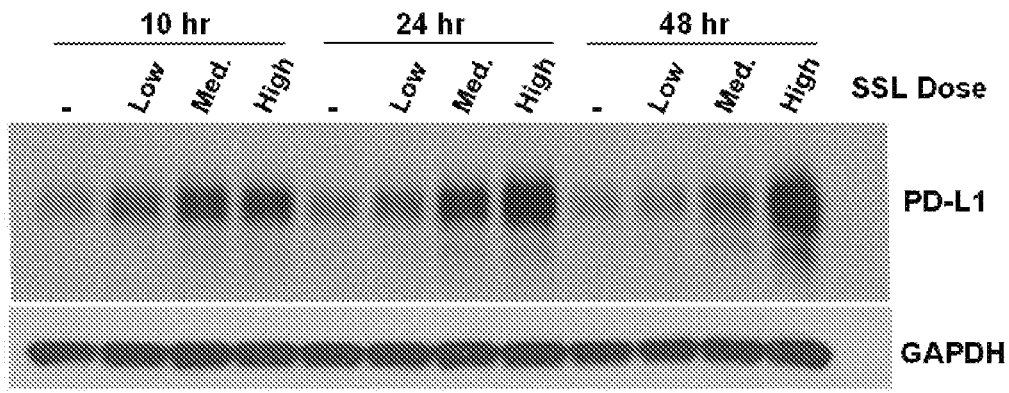
Figure 3B:
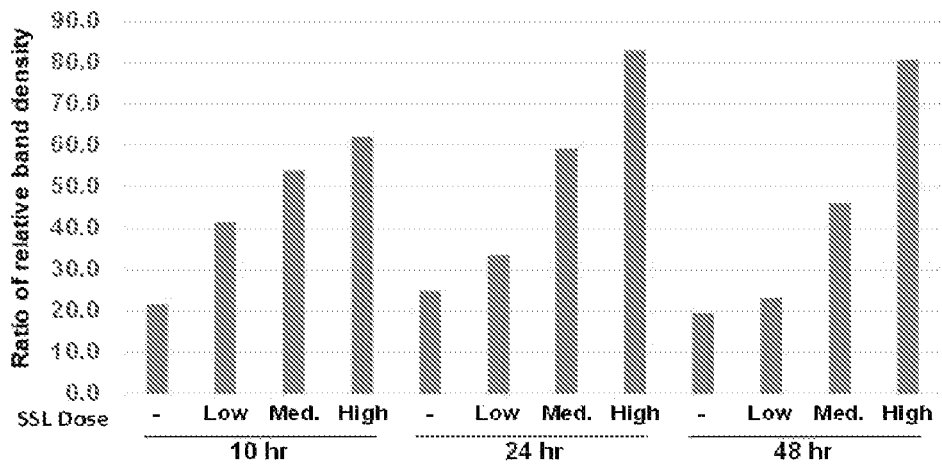
Figure 3C:
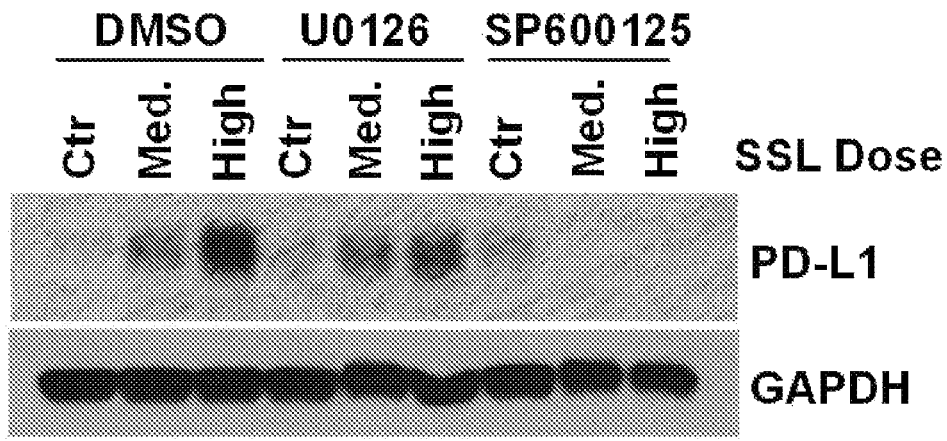

FIGS. 3A, 3B, and 3C show PD-L1 protein induction in response to acute solar simulated light (SSL) in HaCaT keratinocytes. Cells were exposed to low (20 kJ/m2 UVA, 1.3 kJ/m2 UVB), medium (30 kJ/m2 UVA, 2 kJ/m2 UVB) or high (40 kJ/m2 UVA, 2.7 kJ/m2 UVB) doses of SSL and harvested at the indicated time points. Lysates were utilized for Western blots and probed for PD-L1 expression (FIG. 3A). Blots were quantified using ImageJ, using GAPDH as the loading control (FIG. 3B). FIG. 3C shows Western blot analysis of PD-L1/GAPDH from cells that were pretreated with vehicle, U0126 (MEK inhibitor) or SP600125 (JNK inhibitor) for 1 hour prior to SSL exposure. After SSL, inhibitors were added back to fresh medium and cells were harvested 24 hours later for analysis.

A used herein, the term "biomarker" is a measurable substance in an organism whose presence is indicative of some phenomenon such as disease, infection, or environmental exposure.

PD-1 (CD279) is a cell surface receptor that is part of the immunoglobulin superfamily that is expressed primarily on the surface of activated T-cells. PD-1 was initially considered to be a molecule that regulates cell death, but is now identified as a key immune checkpoint inhibitory receptor, which is expressed on activated tumor-specific $CD4^+$ helper and $CD8^+$ killer T lymphocytes. Therapeutic antibody-mediated blockade of PD-1 or one of its ligands, PD-L1, removes the suppressive effects of PD-L1 on cytotoxic T-cells with restoration of host immunity against the tumor. For some patients, this treatment approach can control or eliminate advanced malignant neoplasms, including metastatic melanoma.

Programmed death-ligand 1 (PD-L1), also known as cluster of differentiation 274 (CD274) or B7 homolog 1 (B7-H1), is a protein that in humans is encoded by the CD274 gene. PD-L1 is the main PD-1 ligand, is a transmembrane protein expressed on a variety of cell types, including antigen presenting cells, mainly dendritic cells and macrophages and constitutively expressed by non-lymphoid tissues including heart, lung and others. Binding of PD-L1 inhibits the function of activated T-cells, which is an important mechanism for negative feedback control of inflammation and autoimmunity in the peripheral effector phase of T-cell activation and identifies the PD-1/PD-L1 pathway as a significant immune response checkpoint.

As used herein, "administering" and the like refer to the act of physically delivering a composition or other therapy (e.g. a PD-L1 inhibitor) described herein into a subject by such routes as oral, mucosal, topical, transdermal, suppository, intravenous, parenteral, intraperitoneal, intramuscular, intralesional, intrathecal, intranasal or subcutaneous administration. Parenteral administration includes intravenous, intramuscular, intra-arterial, intradermal, subcutaneous, intraperitoneal, intraventricular, and intracranial administration. Radiation therapy can be administered using techniques described herein, including for example, external beam radiation or brachytherapy. When a disease, disorder or condition, or a symptom thereof, is being treated, administration of the substance typically occurs after the onset of disease, disorder or condition or symptoms thereof. When a disease, disorder or condition, or symptoms thereof, are being prevented, administration of the substance typically occurs before the onset of the disease, disorder or condition or symptoms thereof.

As used herein, the terms "subject" and "patient" are used interchangeably. As used herein, a subject can be an animal (amphibian, reptile, avian, fish, or mammal) such as a non-primate (e.g., cows, pigs, horses, cats, dogs, rats, etc.) or a primate (e.g., monkey, ape and human). In specific embodiments, the subject is a human. In one embodiment, the subject is a mammal (e.g., a human, a dog) having a disease, disorder or condition described herein. In another embodiment, the subject is a mammal (e.g., a human, a dog) at risk of developing a disease, disorder or condition described herein. In certain instances, the term patient refers to a human under medical care or animals under veterinary care.

The terms "treating" or "treatment" refer to any indicia of success or amelioration of the progression, severity, and/or duration of a disease, pathology or condition, including any objective or subjective parameter such as abatement; remission; diminishing of symptoms or making the injury, pathology or condition more tolerable to the patient; slowing in the rate of degeneration or decline; making the final point of degeneration less debilitating; or improving a patient's physical or mental well-being.

The term "effective amount" as used herein refers to the amount of a therapy or medication (e.g., DRI provided herein) which is sufficient to reduce and/or ameliorate the severity and/or duration of a given disease, disorder or condition and/or a symptom related thereto. This term also encompasses an amount necessary for the reduction or amelioration of the advancement or progression of a given disease (e.g., skin cancer), disorder or condition, reduction or amelioration of the recurrence, development or onset of a given disease, disorder or condition, and/or to improve or enhance the prophylactic or therapeutic effect(s) of another therapy. In some embodiments, "effective amount" as used herein also refers to the amount of therapy provided herein to achieve a specified result.

As used herein, and unless otherwise specified, the term "therapeutically effective amount" of a PD-1/PD-L1 inhibitor described herein is an amount sufficient enough to provide a therapeutic benefit in the treatment or management of a premalignant skin cancer or skin cancer, or to delay or minimize one or more symptoms associated with the presence of the premalignant skin cancer or skin cancer. A therapeutically effective amount of an agent (e.g., DRI) described herein, means an amount of therapeutic agent, alone or in combination with other therapies, which provides a therapeutic benefit in the treatment or management of the premalignant skin cancer or skin cancer. The term "therapeutically effective amount" can encompass an amount that improves overall therapy, reduces or avoids symptoms or causes of premalignant skin cancer or skin cancer, or enhances the therapeutic efficacy of another therapeutic agent.

A therapy is any protocol, method and/or agent that can be used in the prevention, management, treatment and/or amelioration of a given disease, disorder or condition. In certain embodiments, the terms "therapies" and "therapy" refer to a drug therapy, biological therapy, supportive therapy, radiation therapy, and/or other therapies useful in the prevention, management, treatment and/or amelioration of a given disease, disorder or condition known to one of skill in the art such as medical personnel.

Sun protected (SP) skin refers to skin sites with minimal exposure to sunlight and no evidence of sun damage.

Sun damaged (SD) skin refers to skin sites with chronic UV damage (wrinkling and pigmentary changes) without clinical evidence of actinic keratoses (AK) or cutaneous squamous cell carcinoma (cSCC).

Solar simulated light (SSL) comprises UVA and UVB irradiation in ratios comparable to natural sunlight.

The present invention provides a solution addressing the industry need as earlier diagnoses and classification of disease profiles allow physicians to conduct individualized targeted treatment, thus improving clinical outcomes.

Referring now to FIGS. 1, 2A, 2B, 3A, and 3B, the present invention features a new method for determining the risk of a subject for developing skin cancer. This invention allows for a method to use quantitative measurements of UV-induced expression of PD-1/PD-L1 pathway family, regulatory, and/or downstream signaling members to classify risk for skin cancer development as well as to determine prophylactic treatment strategies for skin cancer or inflammatory conditions of the skin with susceptibility to PD-1/PD-L1 dysregulation. In some embodiments, the present invention uses changes in PD-1/PD-L1 as indicators for skin cancer risk, skin cancer progression, and personalized therapeutic prevention strategies for skin cancer.

Non-limiting examples of the uses of the present invention comprise: 1) screening tool or diagnostic for risk of skin cancer development; 2) determining personalized medicine strategies for optimal individualized therapeutic prevention; e.g., personalizing initiation and continuation of therapy strategies for prevention of skin cancer or risk thereof; 3) stratifying patients with skin cancer or those at risk for skin cancer; 4) preventing progression of skin cancer; and 5) treating pre-malignant skin lesions with targeted PD-1/PD-L1 interventions.

In appropriate circumstances, determining the risk of skin cancer development comprises measuring PD-1/PD-L1 dysfunction (e.g., increased PD-L1 expression, PD-L1 overexpression, dysregulation of PD-L1 signaling) in pre-malignant (e.g., pre-cancerous) skin lesions, NMSC (e.g., basal cell carcinoma, cutaneous squamous cell carcinoma, Merkel cell carcinoma), cutaneous malignant melanoma, cancers that are caused by UV-induced stress signaling/persistent modulation and mutations, or any condition or treatment that causes or is caused by PD-1/PD-L1 signaling dysfunction, including dysregulation of PD-1/PD-L1 signaling and/or PD-1/PD-L1 protein overexpression.

In preferred embodiments, the sample or skin sample comprises a tissue, a frozen tissue, a formalin-fixed, paraffin-embedded tissue (FFPE), a cell, a group of cells, and/or cultured cells. The tissue or cell further comprises epidermal cell(s), fibroblast(s), endothelial cell(s), A tissue and/or cell sample is obtained from any procedure by which epidermal cells, fibroblasts, or endothelial cells are retrieved from skin specimens comprising shave biopsies, punch biopsies, microneedle, saucerization, surgical excision, and/or stratum corneum stripping.

In some embodiments, the UV radiation is applied using simulated solar light (SSL), UV-A, UV-B, non-ionizing or ionizing, radiation to a region of interest on the skin. In addition, other potential carcinogens such as viruses, including HPV, or topical carcinogens such as arsenic, can be used to induce PD-L1 expression. Non-limiting examples of the region of interest comprise any region that contains healthy tissue, sun-damaged tissue, tissue with suspected pre-malignant lesions or with signs or indications of skin cancer, tissue with known pre-malignant lesions, and/or tissue with known skin cancer of non-melanoma- and melanoma-related lesions.

In preferred embodiments, the non-irradiated skin sample is from a region of interest or area of suspected cancer prior to exposure to UV radiation. The irradiated skin sample is from a region of interest or area of the subject after exposure of UV radiation applied using simulated solar light, UV-A radiation, UV-B radiation, and/or ionizing radiation to the area or region of interest including an area suspected of developing skin cancer. A non-limiting example of the Minimal Erythema Dose (MED) dose of the radiation ranges from of 0.5 to 3.5 MED.

In appropriate circumstances, single and/or multiple irradiated samples are obtained between 1 hour and 72 hours, allowing for measuring PD-1/PD-L1 pathway family or regulatory or downstream signaling member expression at various times post-irradiation.

The PD-1/PD-L1 pathway family or regulatory members comprise PD-1, PD-L1, PD-L2, AP-1, NF-κB family members, or a combination thereof. Others markers may include but are not limited to: MAP kinases (phospho/total ERKs, JNKs, p38), NF-kB family members (phospho/total-p65, p50/p52, IKKs), AP-1 family members (phospho/total cFos, Fra1, Fra2, FosB, cJun, JunB, JunD), AKT, PD-L1, PD-1, CD47, CD4, CD8, IL-6, IL-10, IL-12, Bcl-2, Bax and cleaved Caspase-3.

In some embodiments, PD-1/PD-L1 pathway family and/or regulatory members comprises the protein expression, gene expression (mRNA levels), gene copy number, and/or activity of PD-1/PD-L1 pathway regulatory family members, and measuring PD-1/PD-L1 comprises measuring the protein expression, gene expression (mRNA levels), gene copy number, and/or activity of PD-1/PD-L1 pathway family, regulatory, and/or downstream signaling members. Measuring PD-1/PD-L1 pathway dysfunction (e.g., dysregulation of PD-L1 signaling, PD-L1 protein overexpression) is based on differential expression (of protein levels, mRNA levels, gene copy numbers, gene mutations/deletions/insertions, single nucleotide polymorphisms (SNPs), and/or protein activity) of PD1/PD-L1 pathway family members. Differential expression can be measured through standard and emerging proteomic and genomic technologies, including but not limited to immunohistochemistry (IHC), fluorescence in situ hybridization, reverse-phase protein microarrays (RPPA), mass spectroscopy, gene arrays, ELISA, RT-PCR, PCR, and next generation sequencing. Additional analytical techniques can be used that can accurately and reliably measure analytes relevant to the present invention comprising proteins, protein activity, mRNA, DNA, DNA copy numbers/mutations/deletions/insertions, SNPs.

The present invention further features a method for longitudinally assessing skin cancer risk over time. In some embodiments, the expression and/or activity of PD1/PD-L1 pathway family, regulatory, and/or downstream signaling members are measured in tissue samples longitudinally over time. Changes in PD1/PD-L1 pathway family and/or regulatory members are detected longitudinally and longitudinal levels can be compared to baseline levels. In some embodiments, PD1/PD-L1 measurement is performed in asymptomatic subjects, wherein asymptomatic subjects are subjects without the condition (e.g., non-neoplastic conditions). In appropriate circumstances, baseline levels are normal levels from an aggregate population of asymptomatic subjects without the condition. In other circumstances, baseline levels are relative baseline levels at the time of initial assessment or diagnosis of the condition or levels found in sun-protected (SP) skin (non-exposed skin). Non-limiting examples of times that are assessed longitudinally throughout time comprise: 1) at time of initial assessment; 2) two to seven days post-assessment, 3) one month post assessment, 4) three months post assessment, or 5)>three months. This assessment can determine at risk and/or skin cancer prognosis and progression over time.

In some embodiments, the differential expression of PD1/PD-L1 between the non-irradiated and irradiated sample (e.g., skin tissue) comprises at least 1%, at least 5%, at least 10%, at least 20%, at least 50%, or >50% expression.

In some embodiments, the drugs for therapeutic prevention comprise modulators of PD-1/PD-L1. Non-limiting examples comprise inhibitors to the PD-1/PD-L1 pathway, which result in decreased PD-1/PD-L1 activity and/or expression. In other embodiments, the therapeutically effective drugs, drugs for prevention or prophylaxis, or interventions comprise pembrolizumab, nivolumab, cemiplimab, atezolizumab, avelumab, durvalumab, and additional drugs in development targeting PD1/PD-L1 family.

In some embodiments, the present invention features a method for prolonging life, for personalizing initiation and continuation of therapeutic prevention, and/or for determining the onset of the condition (e.g., skin cancer). Non-limiting examples of prolonging life comprises extending life by at least 1 month, at least 3 months, at least 6 months, at least 1 year, at least 5 years, at least 10 years or greater.

In appropriate circumstances, the method is for reducing the progression of the condition (e.g., skin cancer), diminishing the condition (e.g., skin cancer), and/or delaying the transition from benign to malignant disease. In other embodiments, the methods can be used to personalize initiation and continuation of therapy based on personal clinicopathologic characteristics of the specific patient. Non-limiting examples of personal clinicopathologic characteristics comprise the measured expression of PD-1/PD-L1 pathway family, regulatory, and/or downstream signaling members, gender, age, history of diet, exercise, sun exposure, incidence of severe sunburns, and/or skin cancer development risk specific to an individual subject or patient.

Other embodiments of the present invention may feature a method of stratifying patients with skin cancer or those at risk for skin cancer to determine appropriate medication or therapeutic prevention intervention(s) and dosage of medication or augmentation to intervention(s) to prevent initiation and/or progression of skin cancer.

In some embodiments, the range of MED comprises 0.5 to 3.5 MED. For example, subjects may undergo 1×, 2×, 2.4×, 2.5×, or 3× minimal erythema dose (1 MED, 2 MED, 2.4 MED, 2.5 MED, 3 MED) SSL exposure on sun protected (SP) skin (e.g., buttock). In other embodiments, subjects demonstrating moderate/severe sun damage based on the standardized clinical scale, may undergo an additional acute SSL exposure at 0.5-3.5×MED on the SD skin of forearm. Tissue samples, e.g., 6 mm punch biopsies, can be obtained at baseline up to 72 hr following acute SSL exposure (e.g., 3 or more biopsies at each site per subject). Each subject serves as his/her own control to assess for increased expression of PD-1/PD-L1 upon UV radiation.

EXAMPLES

The following are non-limiting examples of practicing the present invention. It is to be understood that the invention is not limited to the examples described herein. Equivalents or substitutes are within the scope of the invention.

Figure 1:
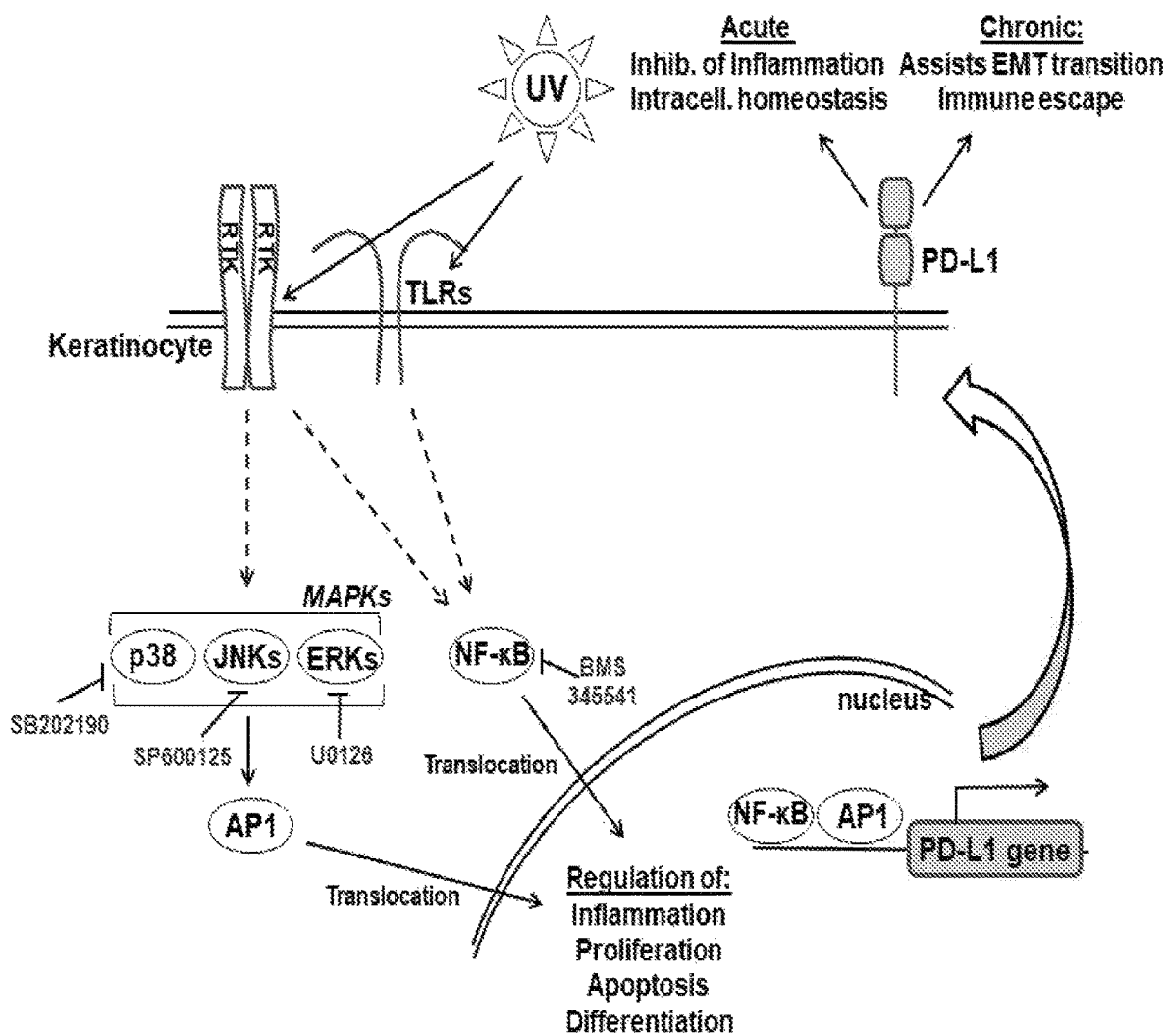
FIG. 1 shows a schema of UV-induced stress signaling activity in keratinocytes and inhibition strategies.
Figure 2A:
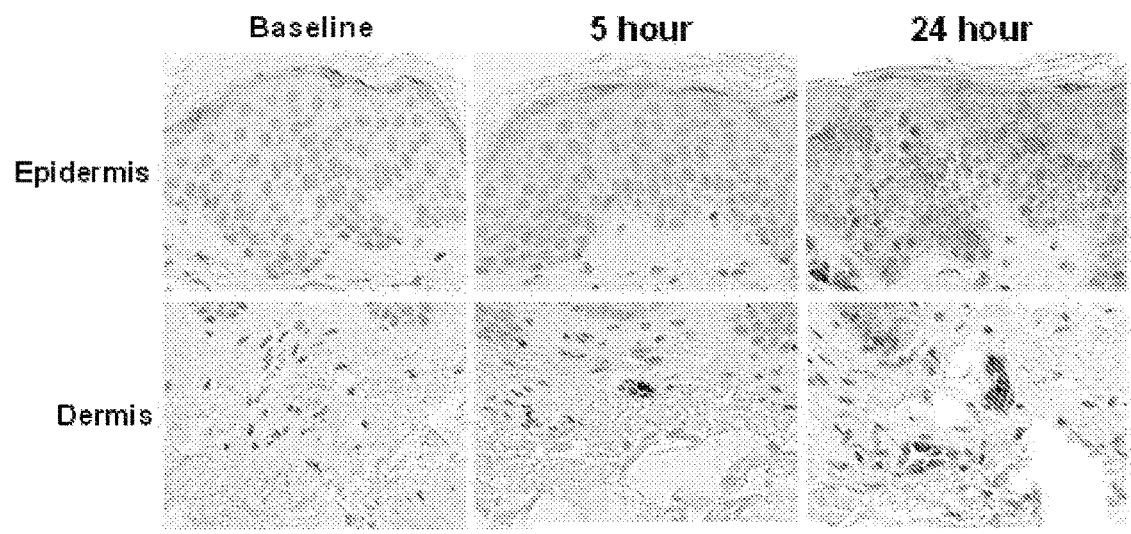
FIGS. 2A and 2B show PD-L1 expression in sun-protected human epidermis after acute solar simulated light (SSL) exposure.
Figure 2B:
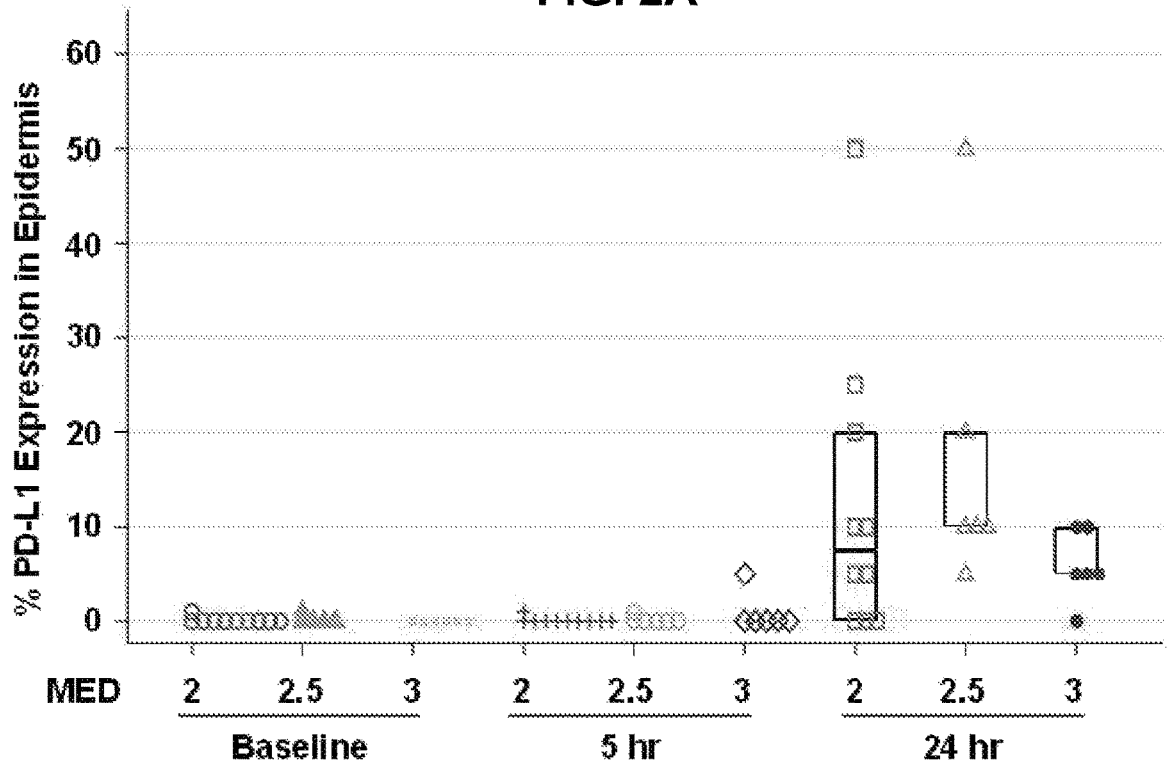

Example 1: Increased Expression of PD-L1 in Human Skin Following Acute SSL Exposure A cohort of samples was examined from acute SSL human studies implementing different minimal erythema doses (MED) in SP skin (2 MED=10 samples; 2.5 MED=5 samples; 3 MED=5 samples). PD-L1 expression was measured by immunohistochemistry (IHC) (PD-L1 SP263, Ventana Medical Systems). From the 20 samples evaluated, 14 (70%) demonstrated ≥5% PD-L1 expression at 24 hours (FIGS. 2A and 2B).

Example 2: In Vitro Expression of PD-L1 Following Acute SSL in HaCaT Cells

Cultured immortalized HaCaT keratinocytes, an established in vitro cell model, were examined to determine whether or not the PD-L1 effect following UV exposure could be recapitulated in vitro. FIGS. 3A and 3B show that HaCaT cells do respond to acute SSL by increasing PD-L1 protein expression in a time- and dose-dependent manner. Intriguingly, this expression seems to be reduced or effectively blocked in the presence of MEK/ERK inhibitors or JNK inhibitors, respectively (FIG. 3C). These preliminary experiments provide promising data suggesting that ERK1/2 and JNK inhibition blocks SSL-induced PD-L1 in HaCaT cells. These findings suggest that PD-L1 is responding to SSL through established stress-signaling pathways in keratinocytes, which may be targetable using clinically relevant pharmacological agents.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A method comprising:
   a) irradiating a portion of skin;
   b) obtaining a portion of the irradiated skin to generate an irradiated skin sample portion; and
   c) detecting expression of programmed death receptor-1 (PD-1) or programmed death ligand-1 (PD-L1) in the irradiated skin sample portion and a non-irradiated skin sample.

2. The method of claim 1, wherein irradiating the portion of skin comprises exposing the portion of skin to radiation ranging from 0.5 to 3.5 Minimal Erythema Dose (MED).

3. The method of claim 1, wherein detecting PD-1 or PD-L1 comprises detecting the protein expression, gene expression, gene copy number, and/or activity of PD1 or PD-L1.

* * * * *